Patented Feb. 19, 1924.

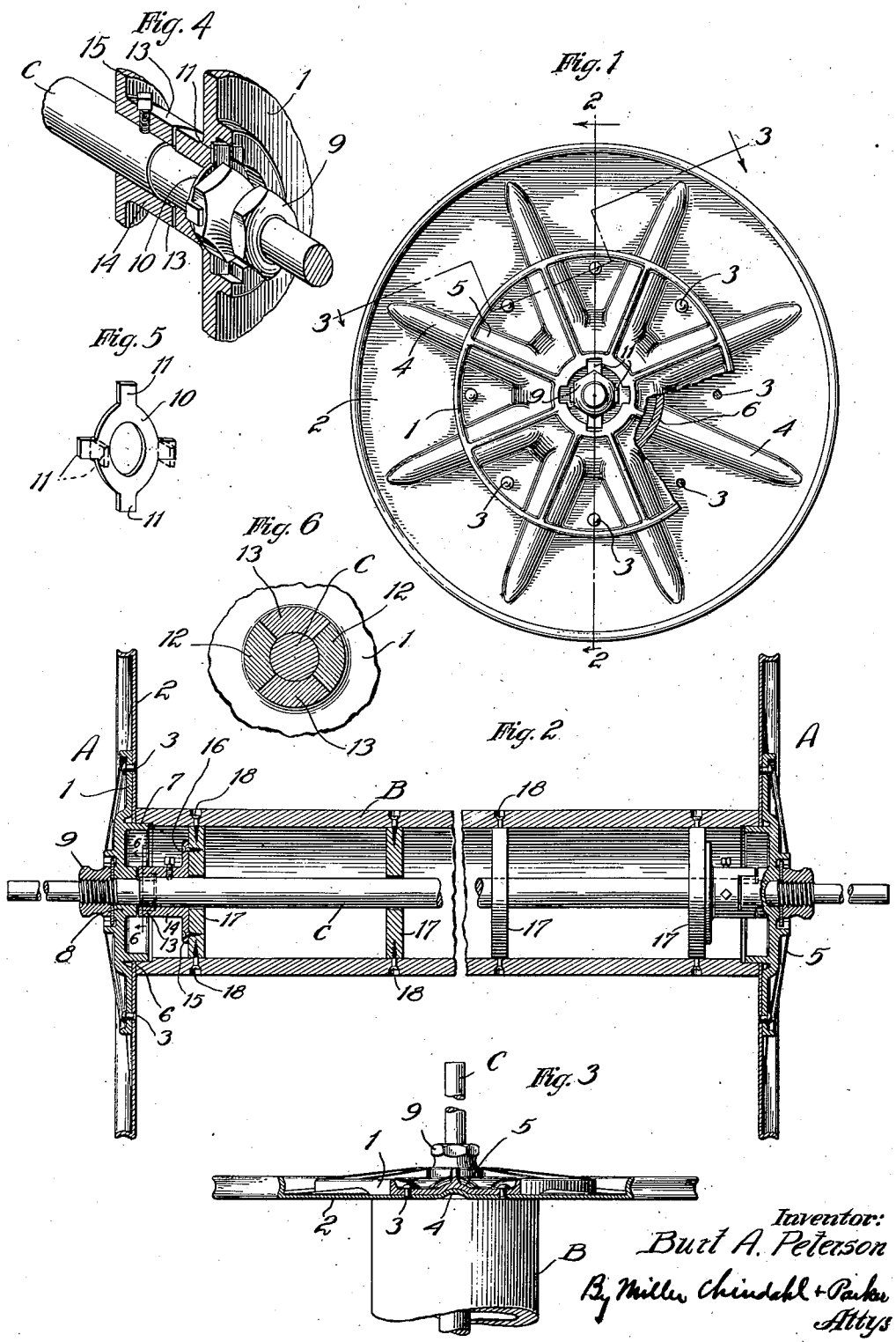

1,484,153

UNITED STATES PATENT OFFICE.

BURT A. PETERSON, OF ROCKFORD, ILLINOIS, ASSIGNOR TO EDGAR S. NETHERCUT, OF EVANSTON, ILLINOIS.

WARP BEAM.

Application filed March 21, 1921. Serial No. 453,899.

*To all whom it may concern:*

Be it known that I, BURT A. PETERSON, a citizen of the United States, residing at Rockford, in the county of Winnebago and State of Illinois, have invented certain new and useful Improvements in Warp Beams, of which the following is a specification.

While a beam constructed in accordance with this invention is useful in warpers of various sorts, it is especially intended for use in warpers designed for high-speed operation. The beams commonly in use are provided with cast-iron heads. These heads sometimes contain casting defects, and they also may become cracked by reason of rough handling, consequently they cannot safely be rotated at high speed.

The particular object of my invention is to provide a beam having heads which are as light as possible, sufficiently strong to withstand rough usage and to withstand the centrifugal force resulting from rapid rotation, and rigid enough to resist the pressure of the yarn mass.

In the accompanying drawings, Figure 1 is an end view, with parts broken away, of a beam embodying the features of this invention. Fig. 2 is a fragmental longitudinal sectional view. Fig. 3 is a sectional view taken in the plane of line 3—3 of Fig. 1. Fig. 4 is a fragmental perspective view. Fig. 5 is a perspective view of a nut lock. Fig. 6 is a section on line 6—6 of Fig. 2.

The embodiment herein shown of this invention comprises two metallic heads A, a wooden barrel B, and an axial shaft or spindle C the projecting ends of which constitute trunnions.

Each beam head A consists of a central cast-metal disk 1 suitably ribbed to make it stiff and relatively light, and a sheet-metal disk 2 secured to the inner side of the disk 1 by means of rivets 3. As shown in Figs. 1 and 3, the disk 2 is provided upon its outer face with radial stiffening ribs 4 which extend into or fit within the inner concave sides of the stiffening ribs 5 on the disk 1.

The disk 2 has a central opening 6 through which projects an annular flange 7 on the disk 1. As shown in Fig. 1, the ribs 4 extend to the opening 6. The flange 7 fits within the end of the barrel B and assists to support the barrel in concentric relation to the shaft C. The disk 2 extends approximately into contact with the flange 7. The disk 1 has a hub 8 that fits upon the shaft C.

The beam head A is clamped tightly against the end of the barrel B by a nut 9 turned on a screw-threaded portion of the shaft C. To lock the nut against rotation, a washer 10 is interposed between the nut and the hub of the disk 1, said washer having lugs 11 certain of which lie in recesses in the disk 1, the remaining lugs being bent into engagement with the perimeter of the nut.

The inner end of the hub of the disk 1 is provided with clutch jaws 12 (Fig. 6) that lie between similar jaws 13 formed on a sleeve 14 secured rigidly to the shaft C. On the sleeve 14 is a flange 15 which is attached by means of screws 16 to a disk 17. The latter is fixed to the barrel B by means of screws 18. The disks 17 may be of wood or any other suitable material.

It will be evident that the beam head construction herein disclosed provides the necessary rigidity and strength and reduces the mass as much as practicable. The use of sheet-metal contributes to lightness and strength to resist centrifugal force, while the use of the cast-metal central portion insures against deformation of the head due to the pressure of the yarn mass. Moreover the head is not so likely to be cracked by rough handling as a cast-metal head.

I claim as my invention:—

1. A warp beam having, in combination, a barrel, two heads and a central shaft, each of said heads comprising a central cast-metal disk and a sheet-metal disk, said disks being rigidly secured together, a nut on the shaft outside of the cast-metal disk for forcing the head against the end of the barrel, the portion of the shaft projecting outwardly from said nut constituting a trunnion, said cast-metal disk having a hub provided with a clutch jaw, a sleeve fixed upon the shaft within the barrel, said sleeve having a clutch jaw engaged by the first-mentioned jaw, a disk within the barrel and secured thereto, and a flange on said sleeve secured to the last-mentioned disk.

2. A warp beam having, in combination, a barrel, two heads and a central shaft, each of said heads having an annular flange extending into the end of the barrel, to support the barrel concentric with the shaft, a nut on the shaft outside of the head for forcing the latter against the end of the barrel, the portion of the shaft projecting outwardly from said nut constituting a trunnion, said head having a hub provided with a clutch jaw, a sleeve fixed upon the shaft within the barrel, said sleeve having a clutch jaw engaged by the first-mentioned jaw, a disk within the barrel and secured thereto, and a flange on said sleeve secured to the disk.

3. A warp beam adapted for rapid rotation and having, in combination, a barrel, two heads and a central shaft extending through the barrel and the heads, each of said heads comprising a central cast-metal disk and a sheet-metal disk rigidly secured together, the cast-metal disk being of substantially larger diameter than the barrel and having upon its inner face an annular flange extending into the end of the barrel to support the barrel concentric with the shaft, the sheet-metal disk having a central opening to receive said flange, and nuts on the outer portions of the shaft for forcing said heads against the ends of the barrel, the portions of the shaft projecting outwardly from said nuts constituting trunnions.

4. A warp beam having, in combination, a barrel, a central shaft and a head, the latter consisting of a cast-metal central portion and a body, said central portion consisting of a disk which overlies the outer side of the central portion of the body, a hub which fits upon the central shaft, and an annular flange on said disk concentric with said hub, which flange fits within a central opening in the body; and means for securing the head and barrel together.

5. A warp beam having, in combination, a barrel, a central shaft and a head, the latter having an inwardly-extending hub which fits upon the central shaft and an annular inwardly-extending flange which fits into and centers the end of the barrel; a metallic head within and secured to the barrel, the last-mentioned head having an outwardly-extending hub which is mounted on the central shaft, said hubs having coacting clutch jaws, and means for securing the first-mentioned head to the barrel.

6. A warp beam having, in combination, a barrel, two heads and a central shaft, each of said heads comprising a central cast-metal disk and another disk, said disks being rigidly secured together, a nut on the shaft outside of the cast-metal disk for forcing the head against the end of the barrel, the portion of the shaft projecting outwardly from said nut constituting a trunnion, said cast-metal disk having a hub provided with a clutch jaw, a sleeve fixed upon the shaft within the barrel, said sleeve having a clutch jaw engaged by the first-mentioned jaw, a disk within the barrel and secured thereto, and a flange on said sleeve secured to the last-mentioned disk.

7. A warp beam having, in combination, a barrel, a central shaft and a head, the latter having a hub which fits upon the central shaft, and an annular inwardly-extending flange which fits into and centers the end of the barrel, a metallic head within and secured to the barrel, the last-mentioned head having a hub which is mounted on the central shaft, coacting clutch jaws to prevent relative rotation between the head and the barrel, and means for clamping the first-mentioned head against the end of the barrel.

8. A warp beam having, in combination, a barrel, a central shaft and a head, which head fits upon the central shaft, said head having an annular inwardly-extending flange which fits into and centers the end of the barrel, a metallic head within and secured to the barrel, coacting clutch jaws to prevent relative rotation between said heads, and means for clamping the first-mentioned head against the end of the barrel.

In testimony whereof, I have hereunto set my hand.

BURT A. PETERSON.